United States Patent [19]

Clemens et al.

[11] 3,870,663

[45] Mar. 11, 1975

[54] POROUS STYRENE POLYFUNCTIONAL METHACRYLATE POLYMERS

[75] Inventors: David H. Clemens, Willow Grove; Herman C. Hamann, Melrose Park, both of Pa.

[73] Assignee: Rohm and Haas Company, Philadelphia, Pa.

[22] Filed: Feb. 27, 1974

[21] Appl. No.: 446,555

Related U.S. Application Data

[63] Continuation-in-part of Ser. No. 267,336, June 29, 1972, Pat. No. 3,817,878, which is a continuation-in-part of Ser. No. 155,279, June 21, 1971, abandoned, which is a continuation-in-part of Ser. No. 884,325, Dec. 11, 1969, abandoned.

[52] U.S. Cl. ........ 260/2.5 B, 260/2.1 E, 260/80.78, 260/86.7
[51] Int. Cl. ........................ C08f 19/10, C08f 19/20
[58] Field of Search ............. 260/86.7, 80.78, 2.5 B

[56] References Cited
UNITED STATES PATENTS

| | | | |
|---|---|---|---|
| 2,616,877 | 11/1952 | McMaster | 260/88.1 |
| 3,427,262 | 2/1969 | Corte et al. | 260/2.2 |
| 3,663,467 | 5/1972 | Albright | 260/2.5 |

FOREIGN PATENTS OR APPLICATIONS

| | | |
|---|---|---|
| 848,555 | 9/1960 | Great Britain |
| 1,135,130 | 11/1968 | Great Britain |
| 1,566,019 | 5/1969 | France |
| 55,644 | 9/1968 | Poland |

OTHER PUBLICATIONS

Rohm & Haas, Brochure CM-32, June, 1969.
Visnyakov, Vysokomol. Soedin. 7, 239–44(1965).
Davankov et al., Vysokomol. Soedin. 4, 1093–97(1962).
Davankov et al., Zhur. Priklad. Khim. 34, 1110–16(1961).

*Primary Examiner*—Melvin Goldstein
*Attorney, Agent, or Firm*—H. Jolyon Lammers

[57] ABSTRACT

A porous copolymer resin containing a major amount of styrene, or other aromatic vinyl constituent, and cross-linked with a minor amount of an aliphatic polyfunctional methacrylate having at least three methacrylate groups such as trimethylolpropane trimethacrylate. The resin is prepared by suspension polymerization and is thereafter given a chloromethylation and aminolysis treatment to convert it into a strong base resin. Other methods of preparing the strong base resins not involving direct chloromethylation can also be used. The resin shows unusual physical stability and is particularly useful in stringent applications such as the recovery of uranium complexes from acidic leach liquors.

7 Claims, No Drawings

POROUS STYRENE POLYFUNCTIONAL METHACRYLATE POLYMERS

This application is a continuation-in-part of our earlier filed and copending application, Ser. No. 267,336 now U.S. Pat. No. 3,817,878 filed June 29, 1972, entitled "Strong Base Anion Exchange Resins" which in turn is a continuation-in-part of our earlier filed and copending application, Ser. No. 155,279 filed June 21, 1971, and now abandoned entitled "Strong Base Anion Exchange Resins" which in turn is a continuation-in-part of application Ser. No. 884,325, filed Dec. 11, 1969, now abandoned.

This invention relates to strong base anion exchange resins and to their preparation and use. The resins have a backbone of styrene or other suitable aromatic monovinyl hydrocarbon in major amount, crosslinked with a minor amount of an aliphatic polyfunctional (at least trifunctional) trimethacrylate, such as trimethylolpropane trimethacrylate, pentaerythritol trimethacrylate or tetramethacrylate, or the like. The resins are prepared by the suspension polymerization of the styrene or other aromatic vinyl constituent and the crosslinking monomer, and are thereafter chloromethylated and aminolyzed to introduce the desired functional groups.

The prior art has suggested the use of difunctional acrylates or methacrylate as crosslinkers for ion exchange resins as well as aromatic crosslinkers such as divinylbenzene. While these crosslinkers are acceptable for many applications, the resins incorporating such crosslinkers under some conditions do or may show a lack of physical or chemical stability or performance characteristics. The prior art has even suggested that trimethylolpropane trimethacrylate might be useful in ion exchange resins. However, when trimethylolpropane trimethacrylate was used as a crosslinker in the attempted preparation of styrene based strong acid cation exchange resins, the styrene/trimethylolpropane crosslinked beads upon sulfonation with concentrated sulfuric acid decrosslinked and dissolved. It is surprising, therefore, that polyfunctional methacrylates, such as trimethylolpropane trimethacrylate, have such outstanding utility in the preparation of styrenebased strong base anion exchange resins, as will be demonstrated more fully hereinafter.

More particularly, the resins of this invention are the reaction products of a tertiary amine and an insoluble, crosslinked copolymer of an aromatic monovinyl hydrocarbon and an aliphatic polyfunctional methacrylate crosslinking agent containing at least 3 methacrylate groups, which copolymer contains haloalkyl groups having the formula $-C_nH_{2n}X$ in which X is a chlorine or bromine atom and $-C_nH_{2n}$ is an alkyene group in which n is an integer from one to four. The resins are, therefore, insoluble, predominately aromatic, crosslinked vinyl copolymers containing substituent groups having the general formula

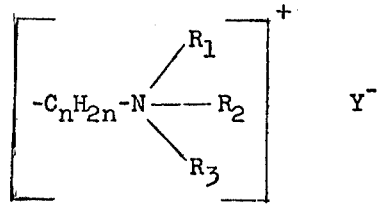

in which n is an integer of value one to four; $R_1$, $R_2$, and $R_3$ are hydrocarbon groups at least one of which can be a hydroxy substituted hydrocarbon group; and Y is an anion, such as a chloride, sulfate or hydroxyl ion.

In the preferred process, resins of the above type are readily prepared by a series of well-defined steps. An insoluble hydrocarbon copolymer is first prepared by copolymerizing a monovinly hydrocarbon such as styrene or vinly naphthalene and trifunctional methacrylate such as trimethylolpropane trimethacrylate. Haloalkyl groups are next introduced into the insoluble copolymer by reacting the insoluble copolymer, in the form a small particles, with haloalkylating agents such as a mixture of an aldehyde and a halogen acid (e.g., paraformaldehyde and hydrochloric acid) or a dihaloalkane and a Friedel-Crafts catalyst (e.g., ethylene dichloride and aluminum chloride) or a haloether and aluminum chloride) or a haloether and aluminum chloride as exemplified below. The resultant haloalkylated copolymer is then reacted with a tertiary amine whereby there is obtained an insoluble, crosslinked, polymeric, quaternary ammonium salt. A final washing with an hydroxide of an alkali metal converts the quaternary ammonium salt to a quaternary ammonium hydroxide.

The final product, an insoluble, polymeric, quaternary ammonium hydroxide, is extremely basic; i.e., of the order of sodium hydroxide. When used in the treatment of acidic liquids and gases, the resin exchanges its hydroxyl groups for the anions present in the fluid with the result that the acidity of the fluid is removed and the quaternary ammonium hydroxide is converted to a salt.

In the first step which involves the preparation of the hydrocarbon copolymer, a monovinyl hydrocarbon is polymerized together with a trifunctional methacrylate. That is, an aromatic hydrocarbon containing one vinyl substituent is copolymerized with a trifunctional methacrylate containing at least three vinyl substituents. Hydrocarbons of the first class are typified by the following: Styrene, ortho-, meta-, and paramethyl styrenes, ortho-, meta-, and para-ethyl styrenes, vinyl naphthalene, vinyl anthracene, and the homologues of the above. While trimethylolpropane trimethylacrylate is the cross-linker of choice, other cross-linkers having at least three methacrylate groups which may be used include, for example, pentaerythritol trimethacrylate or tetramethacrylate and glycerol trimethacrylate.

In preparing the copolymers a predominant amount on a weight basis of the monovinyl hydrocarbon is employed. That is, more than half of the total number of units, by weight, of hydrocarbon employed are those of the monovinyl hydrocarbon. It is preferred that the monovinyl hydrocarbon constitute from 60 to 99.9 percent, on weight basis of the mixture of monovinyl hydrocarbon and cross-linking agent. That is to say, it is preferred that the amount of the aliphatic cross-linker constitute 0.1 percent to 40 percent of the mixture on a weight basis, more preferably ** to 25 percent by weight, the balance in each instance being essentially the monovinyl aromatic hydrocarbon. The latter is a cross-linking agent which imparts insolubility, complexity, and hardness to the copolymer. It has been shown that the use of even less than 0.1 percent of the cross-linking agent will result in a copolymer which is insoluble in organic liquids, although it may swell in some organic liquids. As the amount of cross-linker is increased, the resultant product becomes increasingly dense and corresponding difficult to haloalkylate. Copolymers of a cross-linker and a mixture of two or more monovinyl hydrocarbons are included within the scope of this invention.

The insoluble copolymers of this invention may be prepared by a variety of well-known methods. Thus, the monomers may be mixed and then polymerized en masse or they may be emulsified or otherwise suspended in a liquid medium and then polymerized. Emulsion- and suspension-polymerization, in which the monomers are first suspended in a non-solvent for the monomers such as water or brine solution and are then heated, agitated, and copolymerized, are much preferred because these methods yield hard copolymers in the form of small spheroids, globules, or "beads" and the size of such particles can be regulated and controlled. Thus, particles ranging in size from 5 to 325 mesh may be prepared. The extremely fine particles of approximately 40 to 150 microns in diameter are particularly useful in certain new ion-adsorbing techniques. Furthermore, very fine or porous particles may be haloalkylated and ultimately aminolyzed more rapidly and more extensively than particles which are larger and/or more dense. A modification of the suspension-polymerization method which produces very desirable results involves suspending and polymerizing a solution of the monomers in a chemically inert solvent which is immiscible with the suspending liquid and later removing the occluded or trapped solvent by leaching, drying, or distilling from the hard polymerized particles. This process yields particles of resin which are porous and which, due to their porosity, react more readily. The resins of this invention can be made up in gel form, as heretofore described, or they may be produced in macroreticular form by following the teachings of Meitzner et al; see, for example, British Pat. Nos. 932,125 and 932,126, or by other techniques now known in the art.

The polymerization of the vinyl compounds is accelerated by means of well-known catalysts which provide oxygen. These catalysts include ozone, organic peroxidic agents typified by ozonides, peroxides such as acetyl peroxide, lauroyl peroxide, stearoyl peroxide, tert.-butyl hydroperoxide, benzoyl peroxide, tert.-butyl perbenzoate, di-tert.-butyl diperphthalate, di-tert-butyl peroxide, and the barium salt of tert.-butyl hydroperoxide, inorganic agents such as barium peroxide, sodium peroxide, hydrogen peroxide and the so-called "per" salts such as the water-soluble perborates, persulfates, and perchlorates. The catalysts are employed in suitable amounts ranging from 0.1 percent to about 2.0 percent based on the weight of the monomeric material to be polymerized.

The second step in the preparation of the products of this invention is one in which the insoluble, influsible, cross-linked polyvinyl hydrocarbon is haloalkylated. This step involves introducing into the polymer a plurality of bromoalkyl, or, preferably, chloroalkyl groups; that is, groups having the general formula $-C_nH_{2n}-X$ as described above. While groups containing one to four carbon atoms are embraced by this invention, it is preferred to employ those compounds in which chloromethyl groups, $-CH_2Cl$, are added to the insoluble polymer, because the chloromethyl products are by far the most reactive. The carbon atoms in the group $-C_nH_{2n}$ may be in a straight or a branched chain.

The step of haloalkylating the insoluble hydrocarbon copolymer may be carried out in a variety of ways. For example, the polymer may be reacted with a mixture of an aldehyde and hydrochloric acid or a mixture of a dihalide and a Friedel-Crafts catalyst. Methods of chloroalklylating which may be used for introducing the $-CH_2Cl$ group and which also serve as guides for introducing $-C_2H_4X$, $-C_3H_6X$, and $-C_4H_8X$ groups are described in "Organic Reactions" vol. I chapter 3, page 63 et seq. (John Wiley & Sons, Inc., N.Y.C., 1942).

The extent of the haloalkylation reaction may be conveniently determined by a halogen analysis. It is desirable that as many haloalkyl groups as possible be introduced into the insoluble copolymer because the number of such groups determines the number of quaternary ammonium groups in the final product; and, of necessity, the number of such quaternary ammonium groups determines the ultimate capacity of the resin to adsorb anions. Although resins containing relatively few quaternary ammonium groups have some capacity for adsorbing or exchanging anions, it is necessary from a practical standpoint to add a large number of such groups in order to produce a resin of sufficiently high capacity as to be commercially attractive. The minimum number of such groups should be one for every 15 aromatic hydrocarbon nuclei in the polymer. This, of course, requires that at least one haloalkyl group be first added for every 15 aromatic hydrocarbon nuclei; and in the case of a chloromethylated copolymer of styrene and 1 percent trimethylol propane trimethacrylate such a product would analyze about 2 percent chlorine. The upper limit is that reached when every available position in the aromatic nuclei is haloalkylated. Satisfactory resins of high capacity can be made in which the number of haloalkyl groups, and, hence, the number of quaternary ammonium groups which are introduced is less than the theoretical maximum. Thus, very valuable resins are those made by aminating, with a tertiary amine, copolymers containing from 3 to 6 haloalkyl groups for every four aromatic hydrocarbon nuclei.

The next step in the formation of the anion-exchange resin is the aminolysis of the haloalkylated copolymer with a suitable tertiary amine. This reaction is preferably carried out by adding the amine to the haloalkylated polymer while the latter is suspended and agitated in a liquid which is a solvent for the amine. The mixture may be allowed to react at room temperature or, preferably, at elevated temperatures, after which the resin, containing quaternary ammonium salt groups, is freed of the liquid.

The tertiary amine is usually used in the form of the free base. Tertiary amines containing unsubstituted hydrocarbon substituents as well as hydroxy substituted hydrocarbon substituents are operable. The hydrocarbon substituents of the amine may be alkyl groups, aryl group, cycloalkyl groups and aralkyl groups. Suitable tertiary amines are typified by the following: Trimethyl amine, triethyl and tripropyl amines, dimethyl ethyl amine, diethyl cyclohexyl amine, tricyclohexyl amine, triphenyl amine, diphenyl ethyl amine, benzyl dimethyl amine, benzyl phenyl methylamine, dimethylaminoethanol, and the like.

As has been stated, the products of this invention are insoluble, infusible quaternary ammonium compounds. As prepared, they are quaternary ammonium salts; but the salts may be readily converted into quaternary ammonium hydroxides by washing with an hydroxide of an alkali metal.

The resins of this invention are quaternary ammonium compounds, and the resins in the form of the hydroxide are extremely strong bases which neutralize acids and split salts. Their strength is like that of an alkali-metal hydroxide, for example, sodium hydroxide. Thus, an hydroxyl ion of the resin may be exchanged for a chloride ion, a chloride ion for a sulfate ion, and so on; and the cation of the salt is not adsorbed.

Not only do these resins reduce acidity but they are capable of removing anions per se from salt solutions as well. Thus, when a solution of sodium chloride is flowed down through a column of a resin of this invention in the hydroxyl form, the chloride ions of the salt solution are exchanged for the hydroxyl groups formerly associated with the resin, and the liquid leaves the column as a solution of sodium hydroxide. The resins may be regenerated by washing with a solution of a strong base such as sodium hydroxide. In addition to being chemically active, the resins have such physical characteristics as to be capable of repeated use and regeneration in conventional water-treating equipment.

The following examples serve to illustrate the preferred method of preparing the products of this invention. All parts and percentages are by weight unless otherwise stated.

EXAMPLE 1 a. An aqueous phase is made up with 1,018 parts of water, 2 parts of polyacrylic acid dispersant, 0.9 parts of gelatin and the pH adjusted to about 10 to 10 ½. The aqueous phase is charged to a 3 liter, 3-neck flask fitted with stirrer, reflux condenser and nitrogen sweep. An organic phase consisting of 664 parts of styrene, 12.2 parts of trimethylolpropane trimethacrylate and 6.8 parts of benzoyl peroxide is added to the flask, stirring commenced at about 140–150 RPM with formation of a suitable dispersion. The reactor (flask) is heated to about 80°–82°C. and held for about 3 hours at that temperature. Polymerization is completed by heating to 95° C. for a short time and the resultant slurry is filtered, washed and dried. Copolymer fractions in the −20 +70 U.S. Standard Screen size are separated. The copolymer analyzes about 98.2 percent styrene and 1.8 percent trimethylolpropane trimethacrylate.

b. Chloromethylation and amination are carried out in a conventional manner; thus, the product of a) above is slurried in a mixture of ethylene dichloride and chloromethyl methyl ether in a suitable flask and heated to about 30°–32°C. and a catalyst such as Al $Cl_3$ in additional chloromethyl methyl ether ($CH_3$—O—$CH_2Cl$) is added with stirring. After reaction is complete at 35 to 40°C., the reaction mixture is cooled to about 5°C. and the excess aluminum chloride and chloromethyl ether is decomposed. The copolymer beads are next aminolyzed with anhydrous trimethylamine at a temperature ranging initially from 5°C. for about 1 to 1.5 hours and then raising the temperature to 30°–35°C. and holding there fore about 3 hours. After removal of excess amine, the slurry is cooled, washed with water, drained on a Buchner funnel, and packaged in a moist condition. The strong base anion exchange resin in the form of a particle size "cut" comprising 90 percent retained on a 20 mesh screen, in a free hydroxide form (or chloride form) has a density of about 38 pounds per cubic foot, a solids content of 44.8 percent, an anion exchange capacity of 50.2g/l of $U_3O_8$ per liter of resin.

EXAMPLE 2

The procedure of Example 1 is repeated except that the level of trimethylolpropane trimethacrylate crosslinker is adjusted in one case to (a) 5 percent by weight and in another case (b) to 25 percent by weight. Stable copolymer beads are formed which can be subsequently chloromethylated and aminated to form strong base anion exchange resins.

EXAMPLE 3

The strong base anion exchange resin of Example 1(b) is subjected to a thermal shock test which illustrates the outstanding physical stability of the resin. The resin is placed in cold water at 10°–12°C. The water is drained and the resin contacted with 10 percent by volume sulfuric acid at 60°c. and maintained at this temperature for ** hour, Thereafter the acid solution is drained off and the resin placed in cold water at 10°–12°C. and maintained cold for ½ hour. 100 percent perfect beads (i.e., none cracked or broken) are subjected to twenty cycles of the test above. After twenty cycles 98 percent are still uncracked and unbroken, i.e., still perfectly good. On the other hand, a similar resin which is cross-linked with divinylbenzene shows after 20 cycles in the same test only 47 percent uncracked beads.

The strong base anion exchange resin of Example 1 is subjected to another test of physical durability, i.e., the pump test.

The pump test is a most severe test of physical durability. A cycle consists of loading the resin for 4 minutes with 1N HCl, rinsing with $H_2O$ for 3 minutes, draining for 30 seconds, regeneration for 4 minutes with 1N NaOH, rinsing with $H_2O$ for 3 minutes, and draining for 30 seconds. The bed depth is ca. 2.2' and the pressure drop across the bed is maintained at 33 lbs./in.$^2$/ft. The main measure of durability is how does the flow rate change with cycling.

It can be seen in the table below (Table I) that the ion-exchange resin of Example 1(b), compared with a similar resin but which is crosslinked with divinylbenzene (DVB) maintains flow rate much better.

Table I

| | Pump Test Data Flow Rate (Liter/hr.) | |
|---|---|---|
| Cycles | Example 1(b) Resin | DVB Crosslinked Analogue |
| 0 | 143 | 85 |
| 10 | 122 | 87 |
| 15 | 105 | 30 |
| 20 | 92 | 30 |
| 25 | 83 | — |
| 30 | 74 | — |
| 35 | 70 | — |

The strong base anion exchange resin as prepared in Example 1(b), i.e., in the chloride ionic form, gives particularly good results in the uranium recovery field. For example, the resin of Example 1(b) has a capacity of 50.2 g/l of $U_3O_8$ per liter of resin. The uranium forms anionic complexes with sulfate ions. e.g., $UO_2(SO_4)_n{}^{2-2n}$ where $n=1$, 2 or 3, the most probable species cies present in solution being $UO_2(SO_4)_3{}^{-4}$. The resin can be used, for example, to absorb uranium (present as uranyl sulphate) from an acid (usually sulphuric) solution thereof by contacting the solution with the ion exchange resin at a pH of about 1–5, most preferably about 3.3, containing about 0.01 g/l $U_3O_8$ and about 90 g/l soluble sulphates. The loaded resin is eluted with 1.5 N $H_2SO_4$ or with chloride or nitrate ions in high concentration. In the final operation, the uranium is precipitated from the eluate with ammonia or some other alkaline agent and the precipitate is filtered and dried.

The following example illustrates the preparation of a porous, macroreticular resin using an aliphatic polyfunctional methacrylate having at least three methacrylate groups as a crosslinker.

EXAMPLE 4

An aqueous phase is prepared having 1,590 parts tap water, 10.7 parts of polyacrylic acid dispersant, 7.3 parts of gelatin, and the pH is adjusted to 10 to 10.5 with 50 percent NaOH. The above aqueous phase is charged to a 5 liter, 3-neck flask equipped with a stirrer, reflux condenser and nitrogen sweep. An organic phase mixture containing 880 parts of styrene, 120 parts of trimethylolpropane trimethacrylate, 666.7 parts of methylisobutyl carbinol and 10 parts of benzoyl peroxide is added to the aqueous phase. Agitation is started at 110–120 RPM using intermittent stirring until a suitable dispersion is obtained. The flask is heated to 70° C. in 1.5 hours then 70° C. is maintained for 10 hours. The methylisobutyl carbinol is removed by steam distillation in approximately 6 hours. The copolymer is then washed and dried. The copolymer is then washed and dried. The copolymer is sieved and the −20 +70 mesh (U.S. Standard Screen size) is collected. The copolymer product is a porous macroreticular, resin and is composed of about 88 percent styrene and 12 percent trimethyolpropane trimethacrylate and has a porosity of 0.42–0.43 cc/cc.

EXAMPLE 5

Chloromethylation are amination are effected in a conventional manner. The product of Example 4 above is slurried in a mixture of chloromethyl methyl ether and ethylene dichloride in a suitable flask and heated to 30°–32° C. for 1 hour. A catalyst such as $AlCl_3$ (0.8 mole/more copolymer) is dissolved in additional chloromethyl methyl ether; then the solution is added to the flask dropwise at 38°–40° C. with stirring. The reaction is completed at 50° C. then the slurry is cooled to 5° C. and the excess aluminum chloride and chloromethyl methyl ether is decomposed. The beads are now aminolyzed with an aqueous solution of trimethylamine. The amine is added dropwise at 10°–15° C. over a 1 to 1.5 hour period then the reaction is allowed to proceed at 10°–15° C. for 4 hours. The excess amine is removed by steam distillation then the slurry is cooled, washed and packaged moist. The porous, macroreticular resin in a free hydroxide or chloride form has a solids content of 43.3 percent and an anion exchange capacity of 4.14 meq./g.

EXAMPLE 6

The procedure of Example 5 is repeated but 1.0 moles $AlCl_3$/mole copolymer is used in the chloromethylation step. This resin in a free hydroxide form or chloride form has a solid content of 47.0 percent and an anion exchange capacity of 4.06 meq./g.

The strong base porous macroreticular resins of Examples 4 and 5 are subjected to the pump test described below.

As stated previously the pump test is a severe physical stability test. In the comparison below in Table II, a cycle consists of loading the resin for 4 minutes with 12 percent $H_2SO_4$, rinsing with water for 3 minutes, draining for 30 seconds, regeneration for 4 minutes with 8 percent NaOH, rinsing with water for 3 minutes, and draining for 30 seconds.

The bed depth is approximately 2.2 feet and the pressure drop across the bed is maintained at 33 lbs/in.$^2$/ft. The main measure of durability is how does the flow rate change with cycling. Tabulated are the results of the pump test. Included is the performance of a conventional divinylbenzene crosslinked macroreticular strong base ion exchange resin.

Table II

| Sample: | Number of Cycles | | | | |
|---|---|---|---|---|---|
| | 0 | 10 | 25 | 50 | 100 |
| Conventional resin | 95 | 87 | 64 | 20 | —* |
| Example 5 | 99 | 90 | — | 85 | 85* |
| Example 6 | 99 | — | — | 95 | 101* |

*flow rate (Liter per hour)

EXAMPLE 7

A gel type styrene polymer crosslinked with 2 percent trimethylolpropane trimethylacrylate is chloromethylated in a conventional manner using aluminum chloride and chloromethylmethyl ether. The chloromethylated intermediate so prepared from 208 parts of copolymer is stirred with 195.8 parts of dimethylaminoethanol at 25°–30°C. for 4 hours. Excess amine is removed by distillation with the addition of water to maintain a constant volume until a flask temperature of 100°C. is reached.

The resin is cooled, backwashed to remove fines, dewatered on a Buckner funnel and bottled moist. The gel, anion exchange resin so obtained contains 51.9 percent solids and has a total anion exchange capacity of 3.93 meq./g. of dry material.

EXAMPLE 8

A copolymer prepared as in Example 4 which analyses about 88 percent styrene and 12 percent trimethylolpropane trimethacrylate and having a porosity of about 0.42 cc/cc of beads is chloromethylated in a conventional manner using chloromethyl methyl ether and aluminum chloride. The chloromethylated intermediate so prepared from 203 parts of copolymer is stirred with 195.8 parts of dimethylaminoethanol at 25°–30°C. for 4 hours. Excess amine is removed by distillation with the addition of water to maintain a constant volume until a flask temperature of 100°C. is reached.

The resin is cooled, backwashed to remove fines, dewatered on a Buchner funnel and bottled moist. The porous, macroreticular, product so obtained contains 44.2 percent solids and has a total anion exchange capacity of 3.70 meq./g. of dry material.

Other crosslinking monomers, for example, divinylbenzene, ethylene glycol divinyl ether, etc., may be substituted in minor amounts for the polyfunctional methacrylate, i.e., to provide a mixture of crosslinkers without detracting significantly from the useful properties of the novel resins of this invention. In some cases, the mixture of crosslinkers even improves the properties or characteristics of the novel resins. Thus, in the case of a mixture of crosslinkers containing divinylbenzene, the divinylbenzene provides for a more complete crosslinking and virtually eliminates any extractables possibly present in the resin such as small amounts of uncrosslinked polystyrene which might be extracted out, for example, during a processing step such as the chloromethylation step. Instead of using the classic chloromethylation procedure to prepare strong base resins, one could alternatively use an acrylaminomethylation procedure involving the reaction of the backbone polymer with an acylomaiomethylating agent, in the presence of a swelling or solvating agent such as, for example, ethylene dichloride or a nitropropane, followed by hydrolysis to split off the acyl groups and followed by alkylation to convert the resins to strong base resins, as more fully disclosed in copending application Ser. No. 194,496 of R Wuchter, filed Nov. 1, 1971, and assigned to a common assignee, which application is herein incorporated by reference. The use of DVB as hereinabove described, prevents extractables which might be extracted during the acylaminomethylation procedure. The strong base resin may also be prepared by a sulfuryl chloride technique, involving the use of a backbone polymer having a pendant methyl group, and a solvent and sulfuryl chloride as more fully disclosed in application Ser. No. 248,150 of J. H. Barrett, filed Apr. 27, 1972 and assigned to a common assignee, which application is also incorporated herein by reference. Again, the use of the DVB in combination with the trimethylolpropane trimethylacrylate prevents extractables which might otherwise be extracted during a processing step. Although the replacement of a portion of the trimethylolpropane trimethylacrylate with divinylbenzene is optional (i.e., the DVB may comprise zero percent), when using a mixture of crosslinkers, the weight ratio of trimethylolpropane trimethylacrylate to divinylbenzene is in the range of about 5:1 to 1:1 and, more preferably, about 4:1 to 2:1.

EXAMPLE 9

A series of gel resins crosslinked with mixtures of DVB (divinylbenzene) and TMPTMA (trimethylolpropane trimethylacrylate) are prepared following the procedure of Example 1, above, substituting mixtures of DVB and TMPTMA for the TMPTMA of Example 1. The proportions of TMPTMA and DVB are shown in Table III below. The balance of the composition in the resin beads is styrene. Also given are results showing the excellent wet-dry stability, uranium adsorption capacity as $U_3O_8$, in g/l and anion exchange capacity (AEC). As a measure of physical stability, the resin beads are subjected to a wet-dry test in which the beads are first dried at 105°C. to constant weight, then cooled and then re-wet with tap water at room temperature. The physical appearance is noted both before and after the test and reported as percent untouched (or uncracked) beads.

TABLE III

PROPERTIES OF STRONG BASE RESINS PREPARED FROM MIXTURES OF DVB AND TMPTMA

| Run | % TMPTMA | % DVB | AEC | % Solids | $U_3O_8$ g/l | Appearance* As Is | After W/D[1] |
|---|---|---|---|---|---|---|---|
| 9-1 | 1 | 1 | 4.21 | 45.0 | 52.7 | 96.8 | 96.4 |
| 9-2 | 1 | 1 | 4.03 | 50.3 | 57 | 100 | 94 |
| 9-3 | 2 | 0.5 | 4.39 | 44.5 | 44.5 | 97.2 | 97.2 |
| 9-4 | 2 | 0.5 | 4.01 | 50.3 | 54.9 | 99.8 | 92.7 |
| 9-5 | 2 | 1 | 4.45 | 44.2 | 54 | 96.3 | 96.3 |
| 9-6 | 2 | 1 | 4.23 | 48.0 | 52.5 | 96 | 85.4 |

*% perfect untouched beads
[1]W/D = wet-dry test

EXAMPLE 10

A series of macroreticular resins crosslinked with mixtures DVB and TMPTMA are prepared following the procedure of Example 4, above, substituting mixtures of DVB and TMPTMA for the TMPTMA. The results showing the excellent pump test stability of these resins are given in Table IV.

Table IV

| Run No. | % DVB | %[1] MIBC | % TMPTMA | % Solids | AEC,[2] meq/g | Initial Flow l/hr. | Final Flow l/hr. | % Untouched After 50 Cycles |
|---|---|---|---|---|---|---|---|---|
| 10-1 | 2 | 44 | 8 | 34.6 | 3.94 | 80 | 75 | 100 |
| 10-2 | 2 | 46 | 8 | 29.4 | 3.77 | 88 | 75 | 100 |
| 10-3 | 2 | 46 | 8 | 32.2 | 4.05 | 86 | 79 | 100 |
| 10-4 | 2 | 46 | 8 | 33.9 | 4.02 | 82 | 76 | 100 |
| 10-5 | 2 | 44 | 8 | 32.1 | 4.06 | 80 | 79 | 99.7 |
| 10-6 | 2 | 44 | 8 | 33.4 | 4.14 | 87 | 87 | 100 |

[1]MIBC = methylisobutyl carbinol
[2]AEC = anion exchange capacity

The pump test is described earlier in the specification. The pump test data reported above is obtained using 12 percent $H_2SO_4$ and 8 percent NaOH, following the procedure set forth in the first three paragraphs of page 14, i.e., in Example 6, hereinabove.

EXAMPLE 11

A series of polymers cross-linked with trimethylolpropane trimethylacrylate or a mixture of TMPTMA and divinylbenzene are tested for physical stability by the "Chatillon Test." The macroreticular polymers are prepared in accordance with the procedure Example 4.

A control polymer containing no trimethylolpropane trimethylacrylate and prepared according to the procedure of Example 4 and is also evaluated.

The "Chatillon Test" measures friability — a property common to all ion exchange resins and copolymers — and is defined as the average force required to fracture individual beads. The test comprises measuring friability by fragmenting single beads between parallel planes to simulate the forces exerted on the resin in a commercial column operation. Although the sample polymers comprising 10 beads per sample were tested in both dry and wet forms, the wet form is considered more accurate to indicate physical stability since it more closely approximates field conditions. As shown in the following table V, polymers containing TMPTMA are considerably stronger than polymers containing no TMPTMA.

TABLE V

| Sample | Crosslinker Level | | Extender Percentage | Porosity (cc/cc) | Average Fragmentation Force (g./bead) | |
|---|---|---|---|---|---|---|
| | DVB | EMPTMA | (MIBC) | | Dry form | Wet form |
| 1 | 3 | 4 | 46 | 0.55 | 891 | 836 |
| 2 | 3 | 6 | 44 | 0.464 | 755 | 817 |
| 3 | 3.5 | 4 | 46 | 0.544 | 796 | 774 |
| 4 | 4 | 4 | 46 | — | 477 | 746 |
| 5 | 4 | 8 | 46 | 0.518 | 749 | 642 |
| 6 | 5 | 0 | 44 | 0.50–0.55 | 411 | 534 |
| 7 | 0 | 12 | 45 | — | 735 | 786 |

It is also determined that to compensate for the decreased efficacy of TMPTMA as a crosslinker, more TMPTMA must be present in the monomer mixture to obtain adequately crosslinked polymers. The quality of crosslinking is commonly understood to be directly related to the percent solids present in the final product. Sample 1 containing a total percent by weight DVB/TMPTMA of 7 percent showed the same percent solids and accordingly possesses the same degree of crosslinking as sample 6 containing a total of 5 percent by weight of DVB.

We claim:

1. A porous, resinous polymer consisting essentially of a polymerized mixture of from 60 percent to 99.9 percent by weight of styrene and from 0.1 percent to 40 percent of a methacrylate monomer selected from the class consisting of trimethylolpropane trimethacrylate, pentaerithritol trimethacrylate, pentareithritol tetramethacrylate, and glycerol trimethacrylate or a mixture of said methacrylate monomer with a minor amount of divinylbenzene.

2. A polymer as claimed in claim 1 wherein the polymer has a gelular nature.

3. A polymer as claimed in claim 1 wherein the polymer has a macroreticular structure.

4. A polymer as claimed in claim 1 wherein the methacrylate monomer is trimethylolpropane trimethacrylate.

5. A polymer as claimed in claim 4 wherein the mixture contains about 90 percent to 99.5 percent styrene by weight and 0.5 percent to 10 percent by weight of trimethylolpropane trimethacrylate.

6. A polymer as claimed in claim 4 wherein the mixture contains 95 percent to 99 percent by weight of styrene and 1 percent to 5 percent by weight of trimethylolpropane trimethacrylate.

7. A polymer as claimed in claim 1 which is a polymerized mixture of styrene and a mixture of trimethylolpropane trimethacrylate with divinylbenzene, the weight ratio of the trimethylolpropane trimethacrylate to divinylbenzene being in the range of about 5:1 to 1:1.

* * * * *